[12] United States Patent  (10) Patent No.: US 7,941,243 B2
Borgwarth et al. (45) Date of Patent: May 10, 2011

(54) STORAGE SYSTEM

(75) Inventors: Dennis W. Borgwarth, Andover, MN (US); Adam Marsh, Forest Lake, MN (US); David W. Sullivan, Champlin, MN (US)

(73) Assignee: BAE Systems Land & Armaments L.P., Arlington, VA (US)

( * ) Notice: Subject to any disclaimer, the term of this patent is extended or adjusted under 35 U.S.C. 154(b) by 671 days.

(21) Appl. No.: 12/017,945

(22) Filed: Jan. 22, 2008

(65) Prior Publication Data

US 2008/0211358 A1 Sep. 4, 2008

Related U.S. Application Data

(60) Provisional application No. 60/881,787, filed on Jan. 22, 2007.

(51) Int. Cl.
G06F 7/00 (2006.01)
B65B 37/00 (2006.01)
B65G 1/00 (2006.01)
B65G 65/00 (2006.01)
(52) U.S. Cl. ..... 700/214; 700/213; 700/217; 198/463.3; 414/267; 414/286
(58) Field of Classification Search .................. None
See application file for complete search history.

(56) References Cited

U.S. PATENT DOCUMENTS

| | | | |
|---|---|---|---|
| 3,800,963 A | 4/1974 | Holland | |
| 3,860,130 A | 1/1975 | Frangos | |
| 4,056,066 A | 11/1977 | Homanick | |
| 4,897,012 A | 1/1990 | Brewer | |
| 5,407,316 A | 4/1995 | Coatta et al. | |
| 5,487,636 A | 1/1996 | Mkrtchyan | |
| 5,772,370 A | 6/1998 | Moore | |
| 5,915,905 A | 6/1999 | Hopland | |
| 6,077,019 A | 6/2000 | Corcoran | |
| 6,227,397 B1 * | 5/2001 | Kim | 220/8 |
| 6,321,138 B1 | 11/2001 | Livesay et al. | |
| 6,325,224 B1 | 12/2001 | Brown | |
| 6,694,217 B2 | 2/2004 | Bloom | |
| 6,842,665 B2 * | 1/2005 | Karlen | 700/217 |
| 7,040,848 B2 * | 5/2006 | Sain | 410/46 |
| 7,203,570 B2 | 4/2007 | Karlen | |

* cited by examiner

*Primary Examiner* — Gene Crawford
*Assistant Examiner* — Yolanda Cumbess
(74) *Attorney, Agent, or Firm* — Patterson Thuente Christensen Pedersen P.A.

(57) ABSTRACT

A very high density storage system comprising a storage grid having a number of storage cells and individual cargo carriers where a cargo carrier is stored in a storage cell. The storage system uses a unique set of individually actuatable gear drives on both the top and bottom of each storage cell, but installed at 90 degrees to each other, to move the cargo carrier to a specific storage cell. Software controls and manages the location of each cargo carrier such that when a specific cargo carrier is desired, software instructions cause the cargo carriers to be shuffled within the storage grid until the desired cargo carrier is located at the desired position, such as an unloading position.

20 Claims, 13 Drawing Sheets

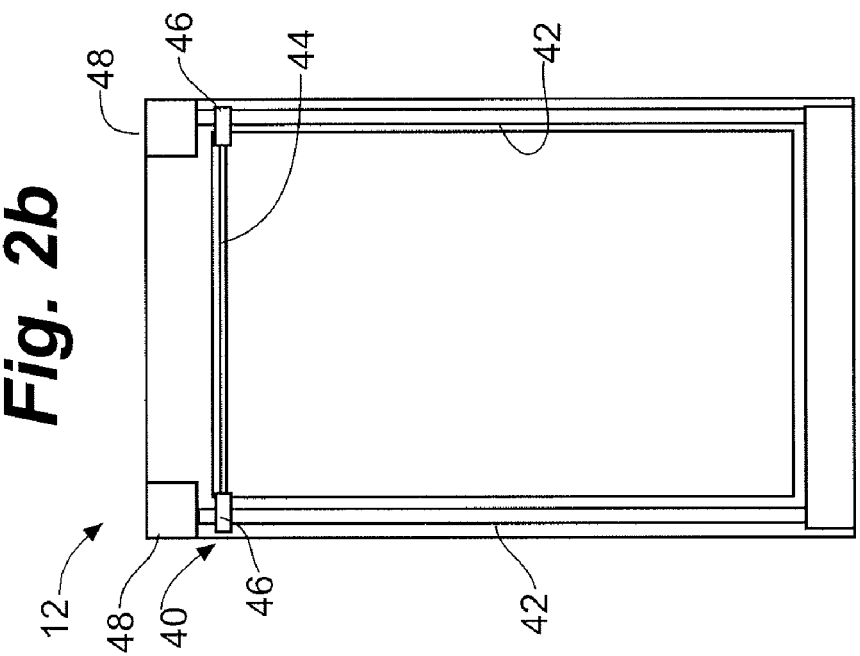
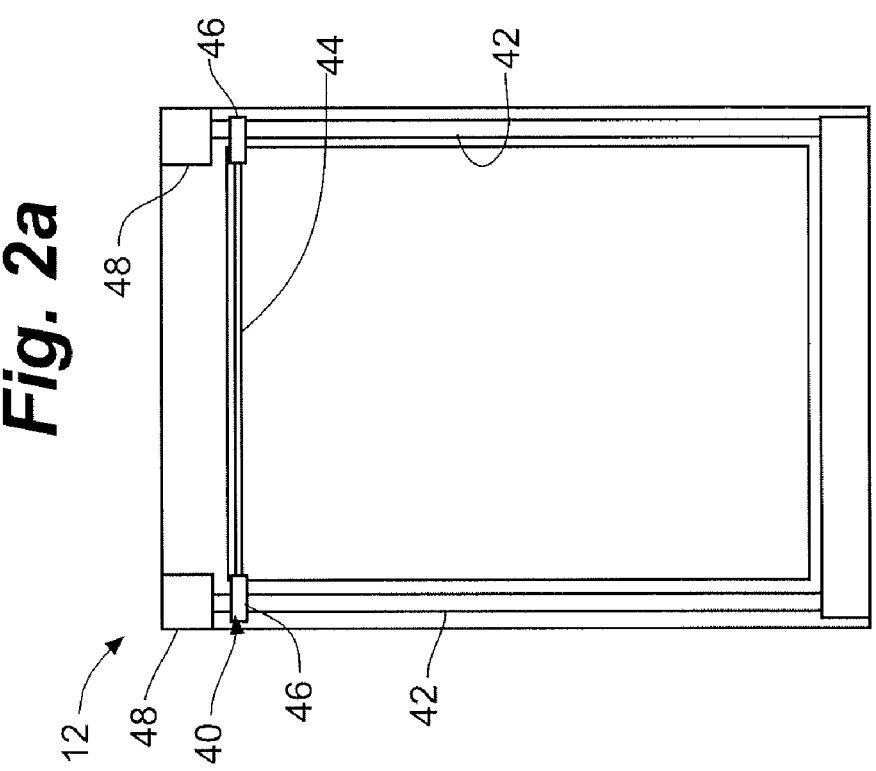

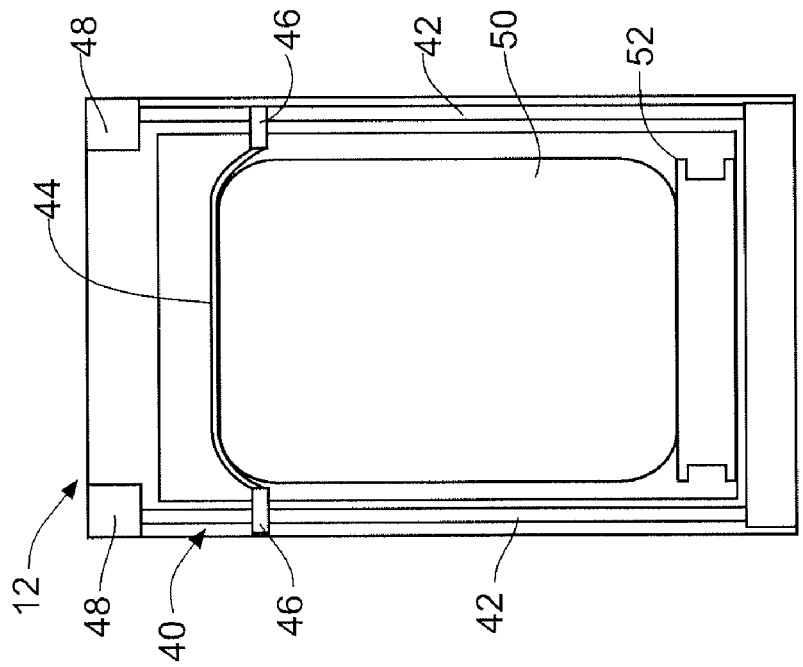
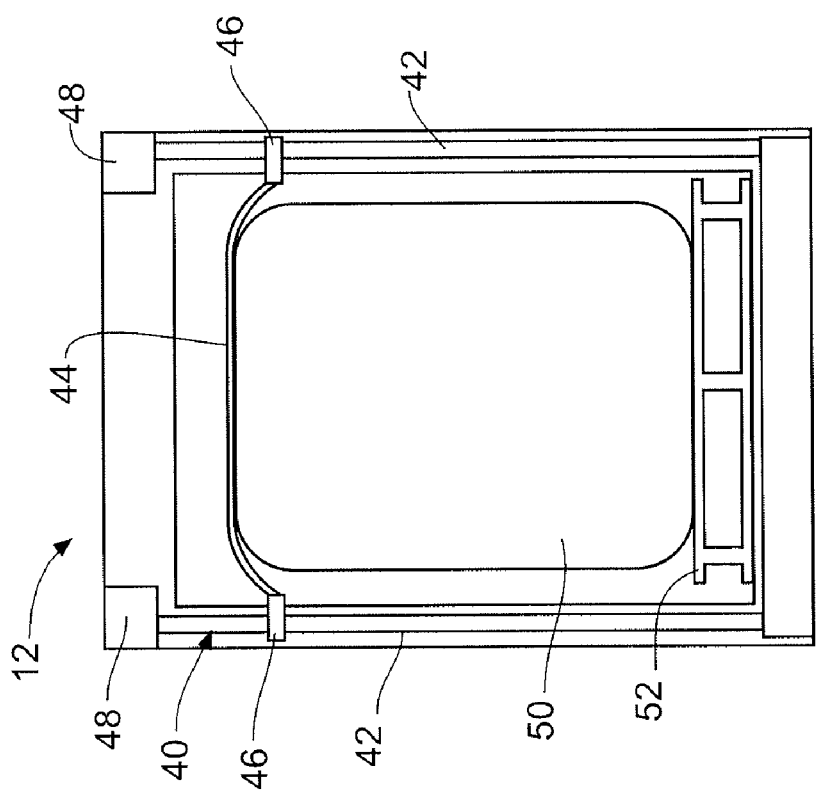

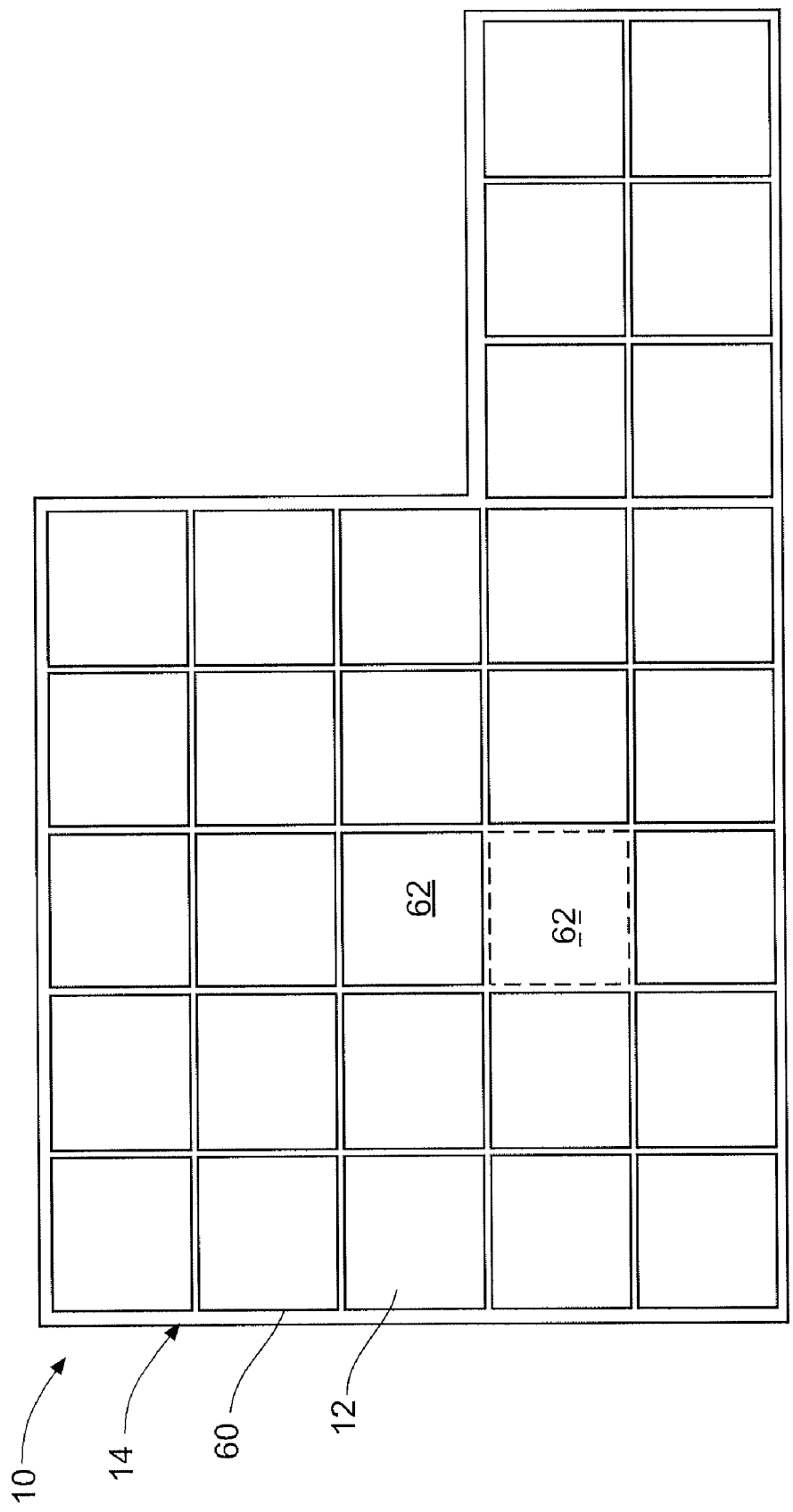

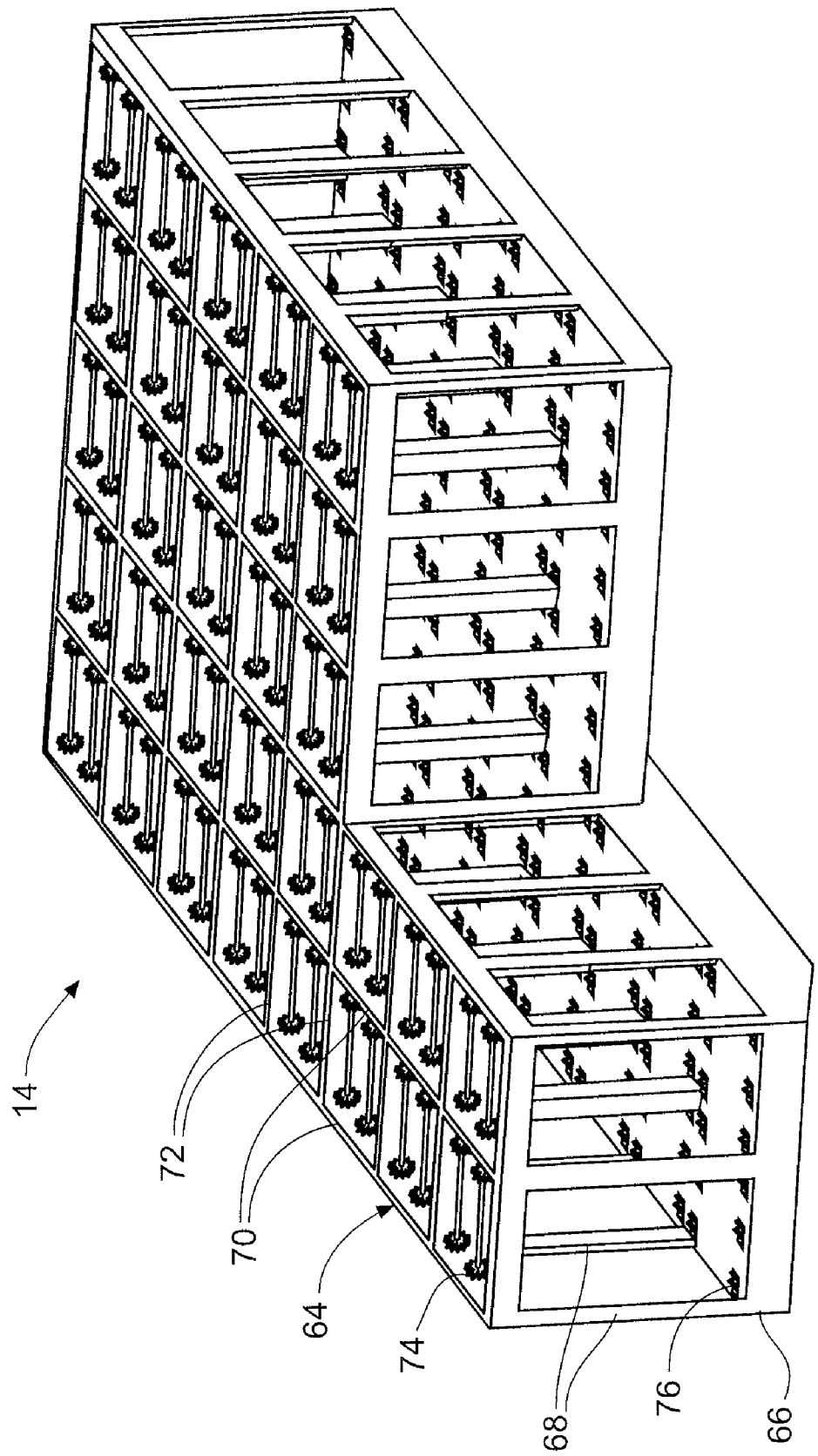

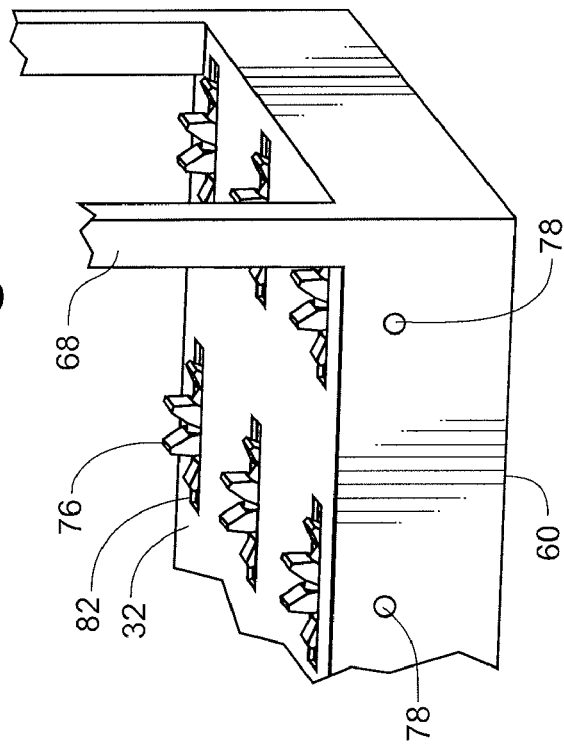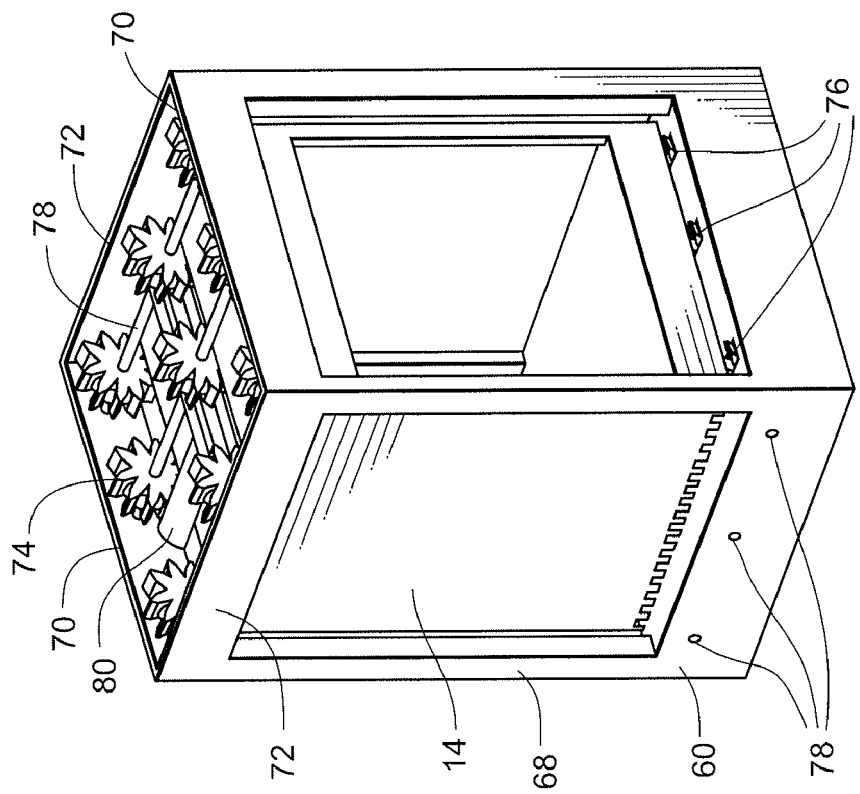

STORAGE SYSTEM

RELATED APPLICATION

The present application claims priority to U.S. Provisional Application No. 60/881,787 filed Jan. 22, 2007, which is incorporated herein in its entirety by reference.

TECHNICAL FIELD

The present invention relates to a storage system for containers. More particularly, the present invention relates to a storage system in which storage containers are compactly stored yet readily accessible.

BACKGROUND OF THE INVENTION

The storage of goods in a warehouse and the storage of goods in a shipping container can consume a significant amount of space, some of which is not utilized in the actual storage of goods. Generally, goods stored in a warehouse or other facility are placed on the platform of a pallet and stored on multi-tiered racks. The racks may accommodate stacking one or two horizontal layers behind a front pallet and stacking several vertical layers, dependent upon the rack system. To access a pallet from the racks, generally a device, such as a forklift, is used to access the desired pallet. If the desired pallet is located behind a number of other pallets, these pallets must be moved first, and stored temporarily on another part of the rack system or on the floor. The desired pallet can then be accessed and the moved pallets can be replaced in position.

If a rack system is not used, then a first layer of pallets may be stacked on the ground, with another layer of pallets stacked on the first layer of pallets. The vertical number of stacked pallets may be limited by the weight of the pallet and the nature of the goods placed on the pallet. Here, too, to access a particular pallet other pallets may need to be moved, temporarily stored in another location until the desired pallet is accessed and moved to a desired location. Then the temporarily moved pallets can be replaced in the pallet stacks. Both of the above configurations requires a forklift or other device to move and temporarily store currently unneeded pallets until the desired pallet is accessed.

Generally, rack systems and floor storage systems require a number of aisles between rows of racks or pallets such that a forklift or other device can proceed down the aisle to come into close proximity to the desired pallet and access the pallet. The aisles required for the movement of forklifts or other such devices is space that could be used for other purposes, such as additional storage.

Hence, there remains a need for the ability to maximize the amount of goods that can be stored in a given amount of space and still retain reasonable access to the goods.

SUMMARY OF THE INVENTION

The storage system or shuffle magazine of the present invention is a very high density storage concept that does not have any of the disadvantages of the traditional continuous chain link or x-y stacking magazine concepts. The shuffle magazine uses the concept of, for example, a 4×4 grid with 15 cells and one open cell so that the operator can shuffle the containers to get them in a certain order. Using this concept, the shuffle magazine has individual cargo carriers, which are moved to a loading station to be filled, moved away to store the item, and then when needed are moved to an unloading station. The requirements for shipboard environment requires operation in both positive and negative g's to account for ship movement in high sea states.

The storage system of the disclosure efficiently manages both the storage and retrieval of cargo. The storage system comprises a plurality of storage cells disposed in a storage grid. The storage cells include an upper drive and a lower drive. Further, the storage system includes cargo carriers for holding cargo, where the cargo carriers include an upper mating surface that interfaces with the upper drive of the storage cell, and a lower mating surface that interfaces with the lower drive of the storage cell. The storage system also includes a cargo carrier management system that is operably connected to the storage grid. The carrier management system includes a database of cargo carriers within the storage grid and a control system for directing movement and storage of the cargo carriers.

Further, the storage system method of the disclosure, for efficiently managing the storage and retrieval of a cargo in cargo carriers in a storage grid, includes placing a cargo carrier in an entry storage cell, identifying the specific cargo carrier, recording the identification of the cargo carrier in a software database, providing instructions to a software control system to transport the cargo carrier to the desired storage cell location in the storage grid, transporting the cargo carrier to the desired storage cell, and recording the cargo carrier location in the software database. Already stored cargo cells may be shuffled so that the specific cargo carrier can reach its assigned location. New locations for the shuffled cargo cells are entered into the software database or, alternatively, the shuffled cargo cells are returned to their pre-shuffled locations.

For retrieval of a specific cargo carrier, the cargo carrier is identified, the software database is accesses for the location of the specific storage carrier within the storage grid, instructions are provided to the software control system to transport the cargo carrier to a desired retrieval storage cell in the storage grid, and already stored cargo carriers are shuffled based upon instructions received from the software to present the specific cargo carrier in a desired retrieval storage cell for removal. New locations for the shuffled cargo cells are entered into the software database or, alternatively, the shuffled cargo cells are returned to their pre-shuffled locations.

The shuffle grid or magazine of the disclosure uses a unique set of individually actuatable gear drives on both the top and bottom of each container cell. Each gear has a roller element mounted in the root of the gear tooth that allows the mating gear rack to translate freely perpendicular to the direction of the gear drive. By using identical gear drives on the top and bottom of each cell, but installed at 90 degrees to each other, each cell is free to move in an x-y motion depending on which drive (top or bottom) is energized. It should be noted that the two gear drives for a certain cell are not simultaneously actuated. The drive that is not energized acts to hold the cargo container in translation in the driven direction. By putting a gear drive set on top and one under the cargo container allows the container to be constrained in the vertical direction, thus meeting the negative g load requirement. The cargo container also has a flexible net that is connected to four ball screws in the corners on the container that comes down to secure the material into the container.

The main advantages of this system are maximum storage density since, at a minimum, only one cell needs to remain open without a cargo carrier, to operate. More open cells allow faster operation. Only a small amount of cargo cells move at any given time thus limiting the power needed. Time cycles can be minimized through software which directs the required cells to be arranged close to the loading and/or unloading stations prior to when they are needed. Those cells which are not required are "stored" out of the way. This concept has a very flexible footprint since individual cells can be added in any dimension and the software can easily add this cell to the control logic. This software can also detect a bad drive in any given cell and create a work around instruction to avoid this cell while still allowing the rest of the magazine to operate. This graceful degradation is a very desirable feature in any military hardware. Lastly, this shuffle magazine could be adapted to several vertical layers by making one or several cells with the capacity to lift a cell vertically to reach the next layer.

BRIEF DESCRIPTION OF THE DRAWINGS

FIG. 2A is a front elevational view of the cargo carrier with the cargo securing system;

FIG. 2B is a side elevational view of the cargo carrier with the cargo securing system;

FIG. 3A is a front elevational view of the cargo carrier of FIG. 2A securing an exemplary piece of cargo;

FIG. 3B is a side elevational view of the cargo carrier of FIG. 2B depicting an exemplary piece of cargo in the secured condition;

FIG. 4 is a top plan form view of the storage grid of the storage system of the present invention;

FIG. 5 is a perspective view of the storage grid;

FIG. 6 is a perspective view of a cargo carrier supported in a grid square of the storage grid;

FIG. 7 is a perspective view of the base of a grid square;

DETAILED DESCRIPTION OF THE DRAWINGS

Figure 1:
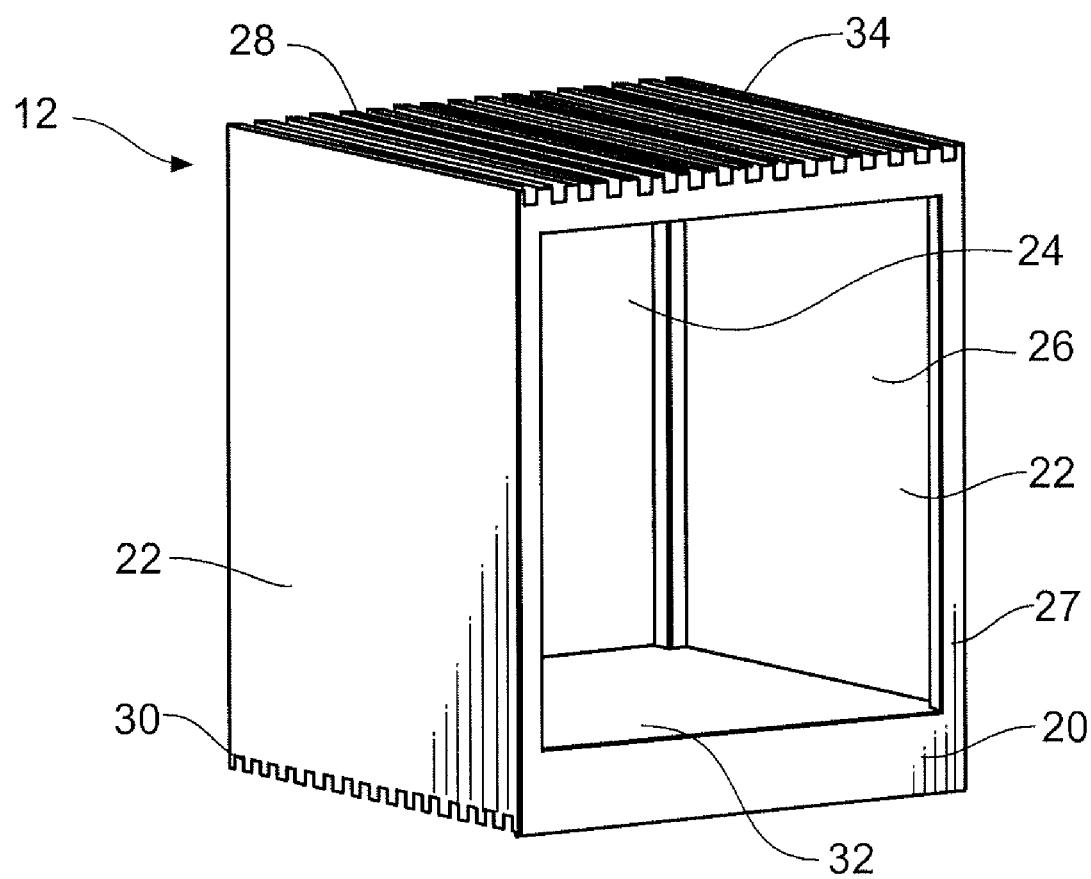
FIG. 1 is a perspective view of the cargo carrier of the storage system of the present invention.
Figure 8:
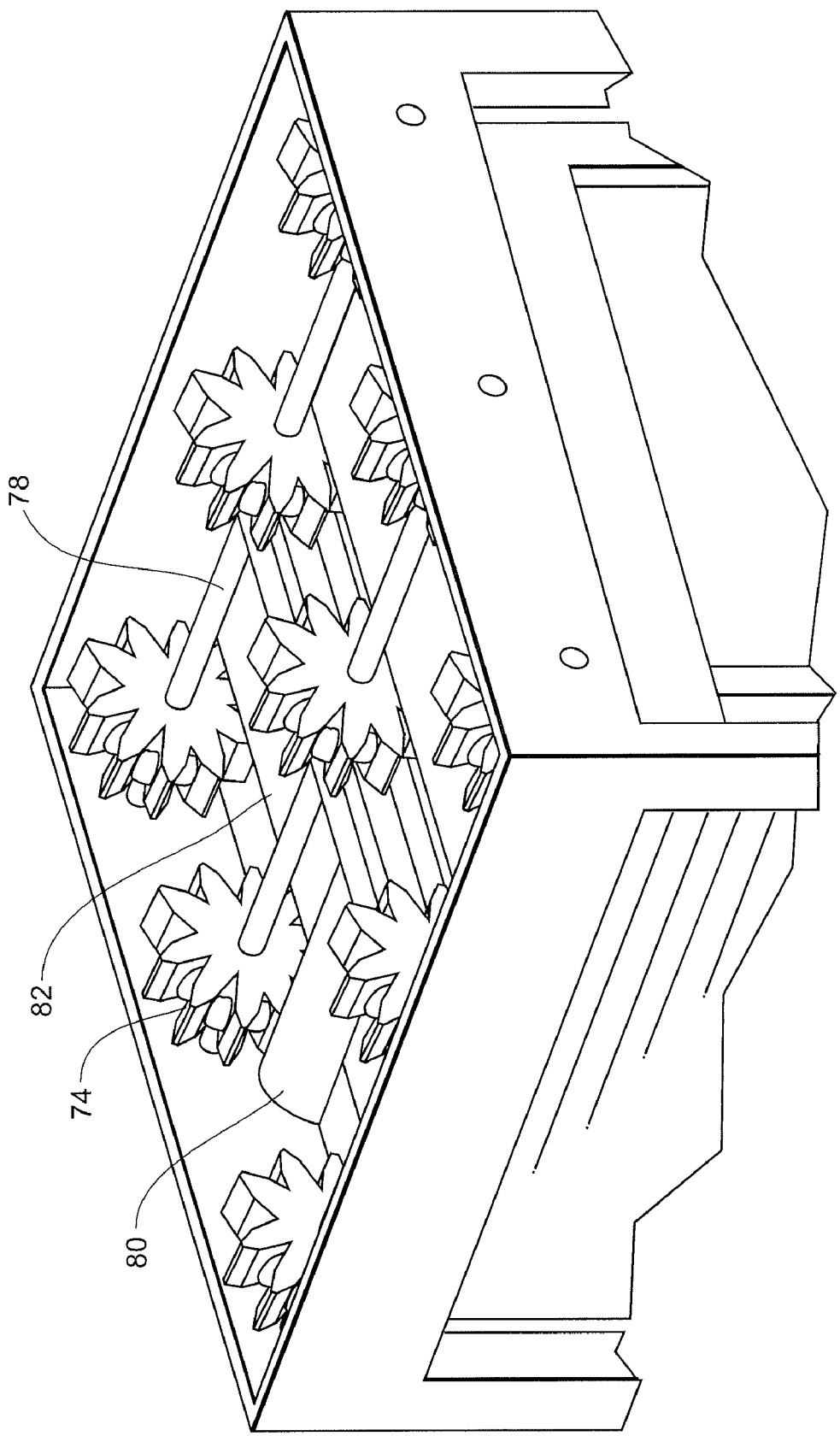
FIG. 8 is a perspective view of the top of a grid square.

The storage system of the present invention is shown generally at 10 in the figures. The storage system 10 may be commonly referred to as a shuffle magazine, as noted above. The storage system 10 has two main components: cargo carrier 12 and storage grid 14.

Referring to FIGS. 1-3*b*, the cargo carrier 12 of the storage system 10 is generally a cube-like container in which a selected piece of cargo may be stored. It is desirable that the cargo carrier 12 be storable in a relatively compact disposition yet be readily retrievable from that disposition.

The cargo carrier 12 has a base 20 and upwardly extending opposed side panels 22 coupled to a rear panel 24. A relatively large front opening 26 is defined in the front 27 of the cargo carrier 12.

A plurality of parallel transverse grooves oriented in a side to side disposition are formed in the lower margin of the base 20. A cargo support surface 32 defines the upper margin of the base 20.

A plurality of parallel traverse grooves 34 are defined in a front to rear orientation of the upper margin of the top panel 28. It should be noted that the traverse grooves 30 and the transverse grooves 34 are orthogonally disposed with respect to one another.

Referring to FIGS. 2A-3B, a cargo securing system 40 is depicted integrated with the cargo carrier 12. The cargo securing system 40 includes sub components: cargo net screws 42 and cargo net 44. The cargo net screws 42 are preferably disposed one in each corner of the cargo carrier 12. The cargo net screws 42 are rotatably disposed within the cargo carrier 12.

The cargo net 44 is initially disposed proximate the top of the cargo carrier 12. The cargo net 44 is preferably rectangular in shape and is preferably formed of a material having a certain amount of elasticity. A threaded coupler 46 is disposed at each corner of the cargo net 44. Each respective threaded coupler 46 is threadedly engaged with a respective cargo net screw 42. Rotation of a cargo net screw 42 results in the threaded coupler 46 riding up or down with respect to the cargo net screw 42 as a function of the direction of rotation of the cargo net screw 42. Rotation of the respective cargo net screws 42 is affected by an electric motor 48 preferably disposed on the top of a respective cargo net screws 42.

As depicted in FIGS. 3A and 3B, a piece of cargo 50 disposed on a pallet 52 has been inserted into the cargo carrier 12. The respective motors 48 have then been actuated causing the threaded couplers 46 and attached cargo net 44 to descend on top of the cargo 50. The elasticity of the cargo net 44 causes the cargo net 44 to stretch around the upper portion of the cargo 50, thereby securing the cargo 50 against the expected negative G forces.

The second component of the stored system 10 is the storage grid 14. The storage grid 14 is depicted in FIGS. 4-12. As depicted in FIG. 4, each of the grid squares 60 is capable of storing the cargo carrier 12. Preferably, there are 30 grid squares 60 and an open grid square 62. Optionally, there may be a second open grid square 62, thereby reducing the number of grid squares 60 by one. A second open grid square 62 is useful for retrieving a cargo container 12 from a second level of the storage grid 14, as depicted in FIG. 12. It is understood that the open grid square 62 is movable and may be located at any position within the storage grid 14. It may be shuffled to another position(s) in order to retrieve a specific cargo carrier 12. Such shuffling necessarily occurs with the movement of selected cargo carriers 12 that are stored within the storage grid 14.

The storage grid 14, as depicted in FIG. 5, includes a frame structure 64. The frame structure 64 includes a base 66. The base 66 has sufficient structural integrity to support the weight of the various cargo carriers 12 stored within the storage grid 14. A plurality of uprights 68 extend upward from the base 66. Any four of the upright 68 that define a rectangle define the corners of a grid square 60.

A plurality of parallel stringers 70 are fixedly coupled to the uprights 68 proximate the upper margin of the respective uprights 68. A plurality of parallelly disposed cross members 72 are disposed orthogonal to stringers 70 and extend between the stringers 70.

A plurality of upper gears 74 are disposed within a space defined by two adjacent stringers 70 and two adjacent cross members 72. A set of upper gears 74 overlays each perspective grid square 60. Each of the upper gears 74 projects downward a sufficient amount to engage the side by side oriented transverse grooves 30 defined in the top of each cargo carrier 12. In a preferred embodiment, there are nine upper gears 74 disposed in each grid square 60. There are three parallel shafts 78, each respective shaft 78 mounting three of the upper gears 74.

A bidirectional electric motor 80 is positioned proximate the upper gear 74. The motor 80 is operably coupled to each of shafts 78 such that operation of the motor 80 in a direction acts to simultaneously rotate the three shafts 78 and their attached upper gear 74 in a common rotational direction.

Figure 9:
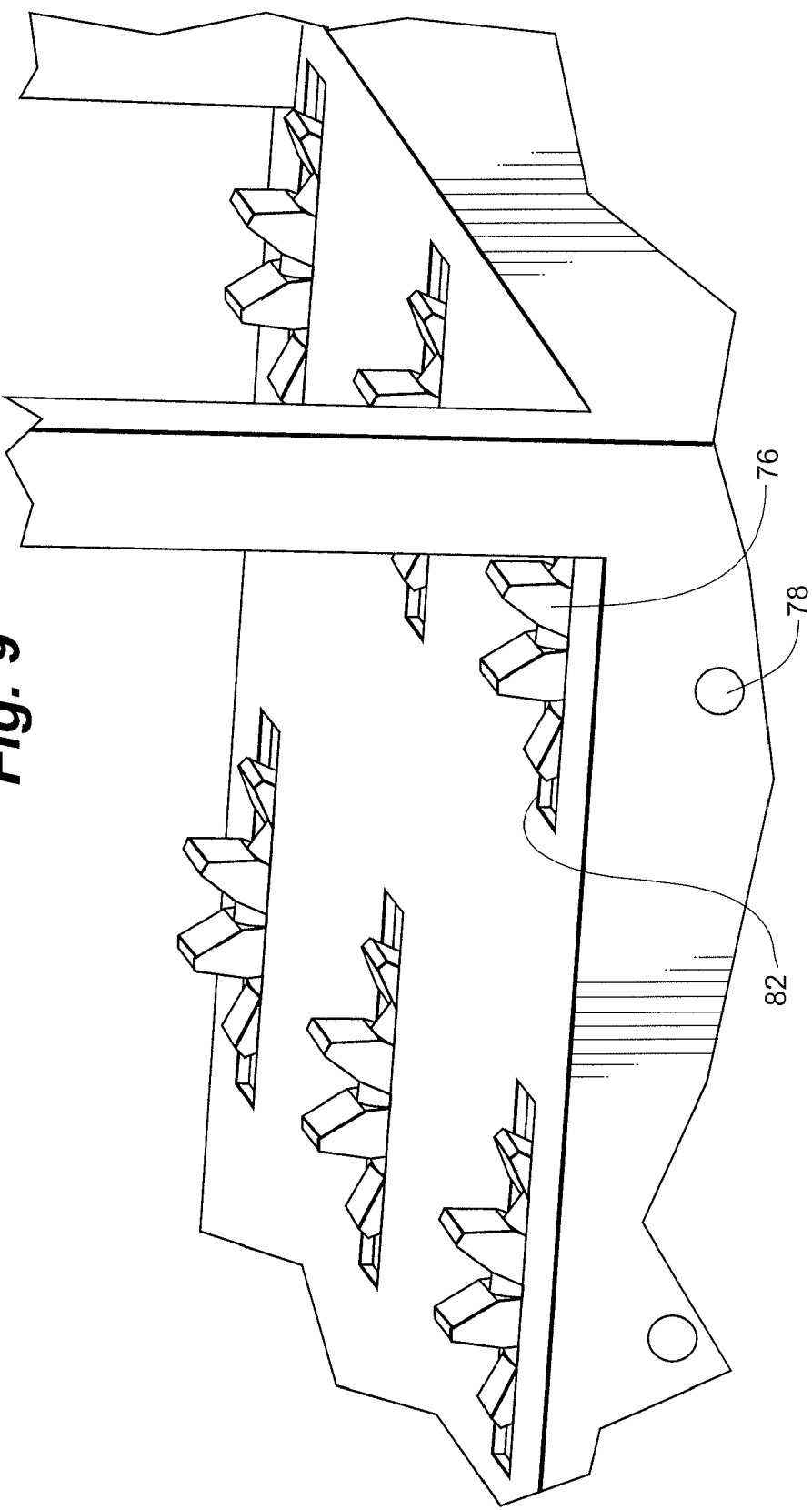
FIG. 9 is a perspective view of a portion of the base of a grid square.

As depicted in FIGS. 7 and 9, lower gears 76 are disposed within the structure defining the base 66 in a manner similar to the disposition of the upper gear 74 described above. The lower gears 76 project through gear openings 82 to engage the front to rear disposed transverse grooves 34. A motor 80 (not shown) is mounted within the base 66 and actuation of the motor 80 effects simultaneous rotation of all the lower gears 76 located within a specific grid square 60 in a common direction. It should be noted that the upper gear 74 and lower gears 76 are orthogonally disposed with respect to one another.

Figure 10:
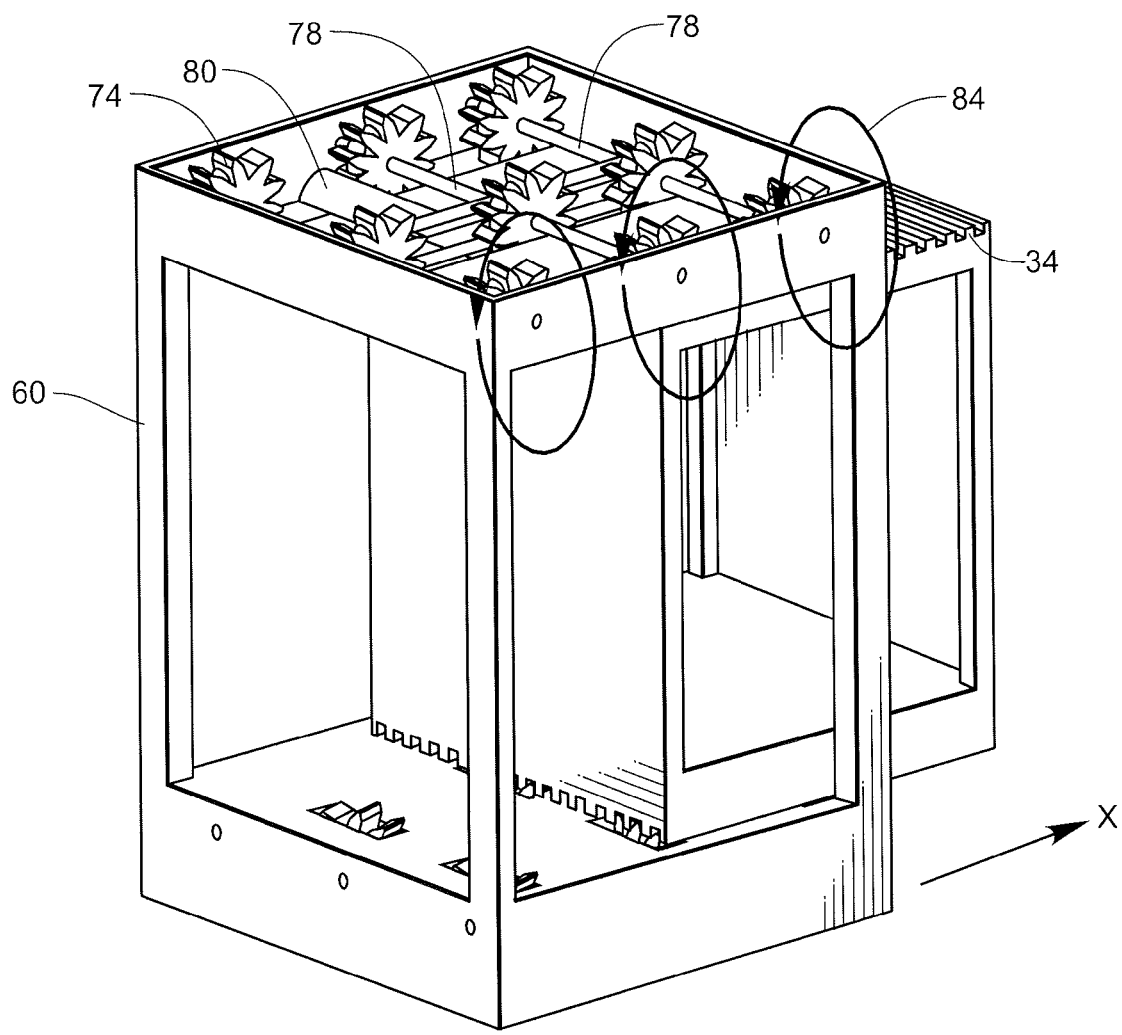
FIG. 10 is a perspective view of a grid square with the cargo carrier being ejected laterally.
Figure 11:
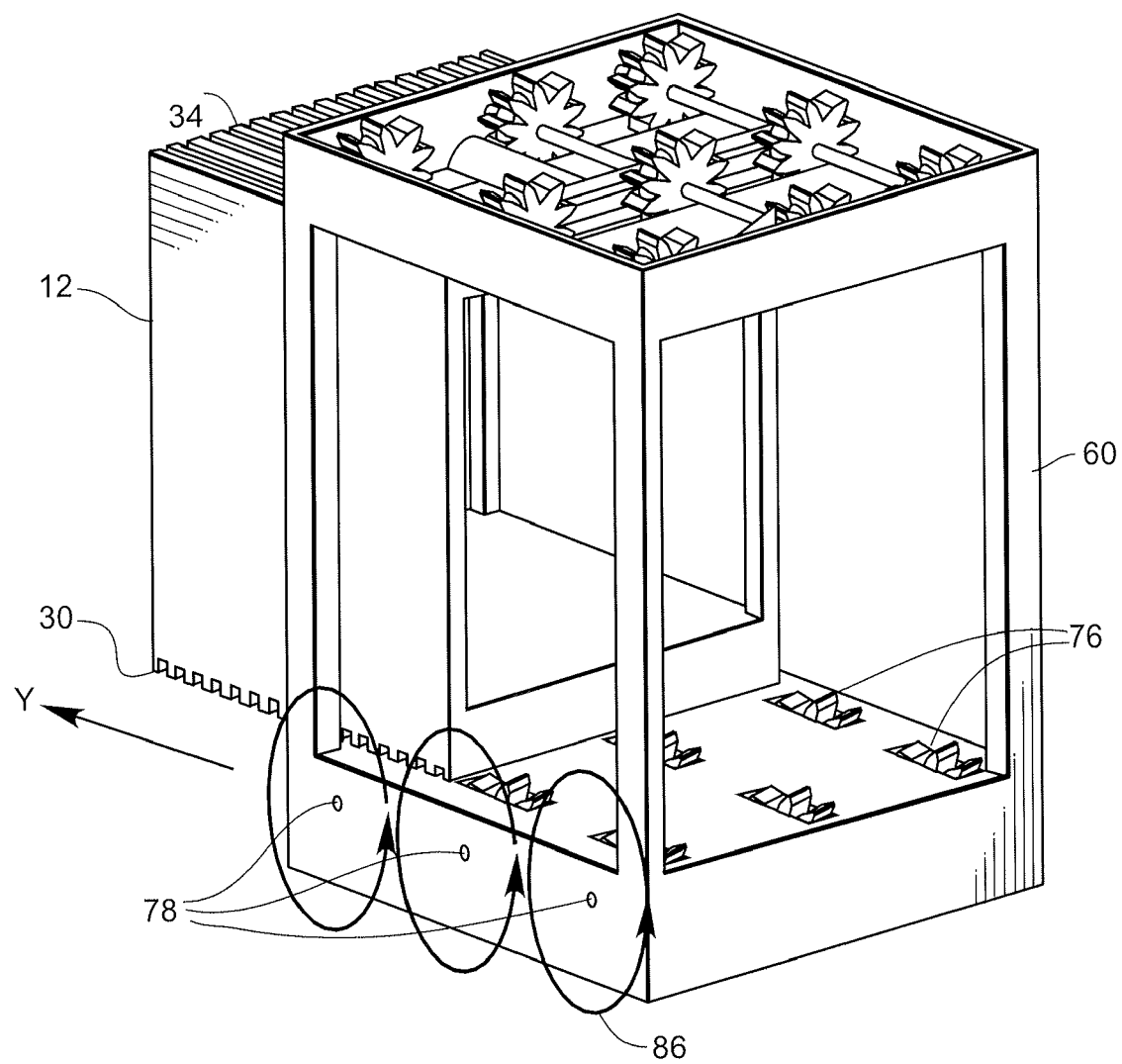
FIG. 11 is a perspective view of a grid square with the cargo carrier being ejected rearwardly.
Figure 12:
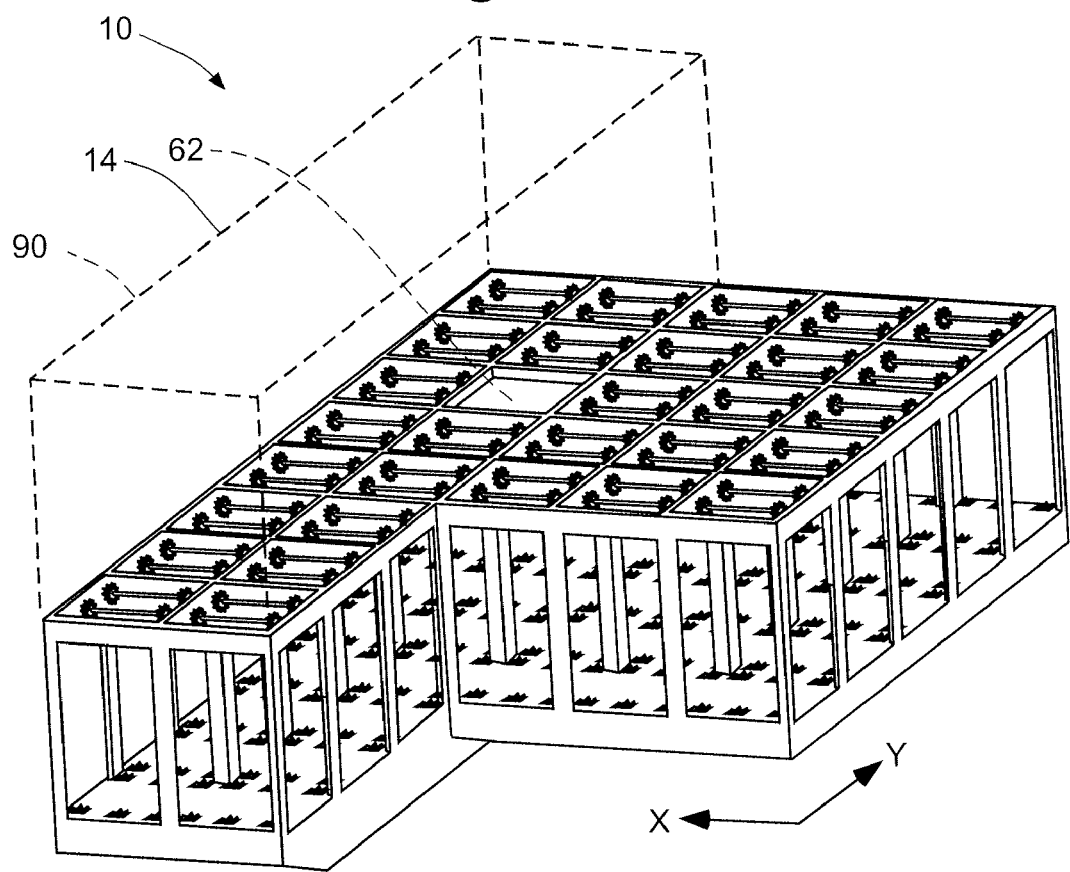
FIG. 12 is a perspective view of the storage system providing for an optional second level of storage.

Operation of the storage system 10 is depicted in FIGS. 10 and 11. In operation, an operator selects a specific cargo carrier 12 to be retrieved from the storage grid 14. The specific cargo carrier 12, upon initial loading into the storage grid 14, is assigned a storage cell 16 location, the location being entered into a software package. The software package now accesses the present location within the storage grid 14 of the specific cargo carrier 12. A plurality of individual cargo carriers 12 may need to be shuffled throughout the storage grid 14 in order to retrieve the specific cargo carrier 12. It is known that with a single open grid square 62, the cargo carrier 12 can be appropriately shuffled to present a specific cargo carrier 12 in a specific grid square 60 for removal from the storage grid 14. A particular storage cell 12 can be assigned as an access storage cell 12, where that one particular storage cell 12 is positioned for retrieval and removal of desired storage cells 12, and also for the drop-off and loading of storage cells 12 into the storage grid 14. Alternatively, the removal cell and the loading cell may be distinct storage cells 12.

Motion of the cargo carriers 12 is in both the x and y directions as depicted in FIG. 12. FIG. 10 depicts motion of the cargo carrier 12 in one x direction. Actuation of the motor 80 in a first direction causes the shaft 78 mounting the upper gears 74 to rotate as indicated by the arrows 84. The teeth of the upper gears 74 engaged the transverse grooves 34, thereby shifting the cargo carrier 12 laterally with respect to the grid square 60. It is understood that actuation of the motor 80 in the opposite direction would effect pulling the cargo carrier 12 into the grid square 60.

Referring to FIG. 11, motion of the cargo carrier 12 in one y direction is depicted. Actuation of the motor 80 (not shown) that is not disposed within the base 66 acts to simultaneously rotate the three shafts 78 in the direction indicated by the arrows 86. Rotation of the lower gears 76 engaged with the transverse grooves 34 acts to shift the cargo carrier 12 rearward in the y direction. It is understood that opposite rotation of the motor 80 acts to pull the cargo carrier 12 into the grid square 60.

The process is somewhat reversed when a cargo carrier 12 is loaded into the storage grid 14. The cargo carrier 12 is loaded into a storage cell 16 and may remain in that position. Alternatively, the cargo carrier 12 may be loaded into an initial storage cell 16, and then moved to a desired final storage location in a different storage cell 16. Movement of the cargo carrier 12 is the same as described above. Information is entered into the software package providing information such as the contents of the cargo carrier 12, potential "need by" date of the cargo carrier 12, or a desired location for the cargo carrier 12. The software provides instructions which actuate the motors 80 which transport the cargo carrier 12 to the desired storage cell 16 in the storage grid 14. The location of the cargo carrier 12 is stored via the software package.

Figure 13A:
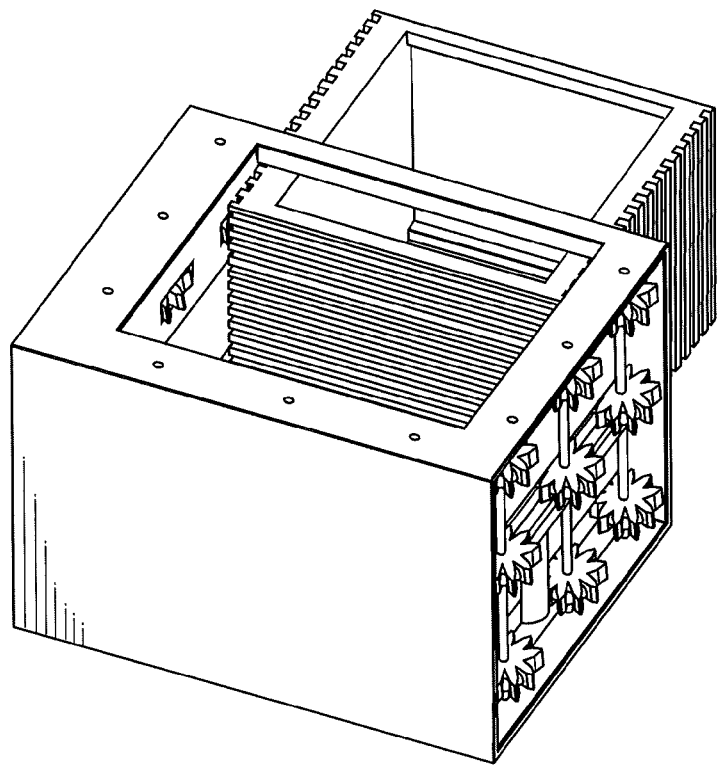
FIG. 13*a* is a perspective view, looking upward, of the storage system cell providing for elevating/lowering a container in an optional second level of storage.
Figure 13B:
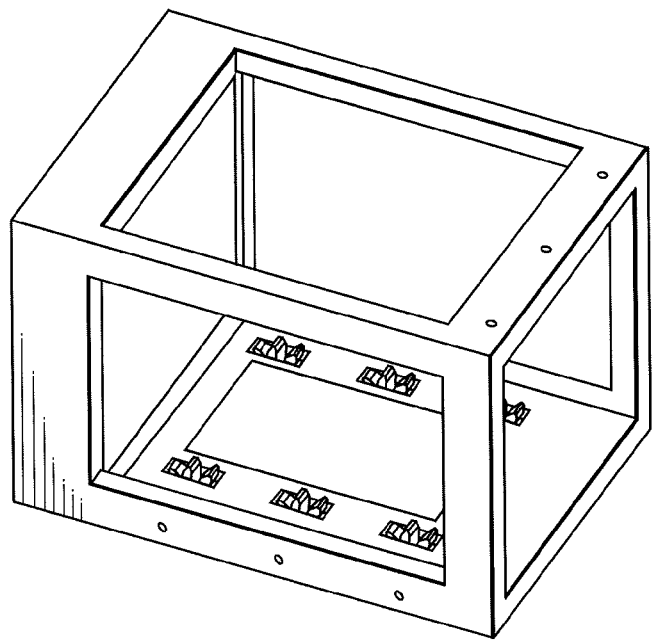
FIG. 13*b* is a perspective view, looking downward, of the storage system cell, showing a different method for elevating/lowering a container in an optional second level of storage.

Referring to FIGS. 12 and 13a, a second level 90 of grid squares 60 may be disposed on top of the first layer of grid square 60 in the storage grid 14. In such case, a dedicated open square 62 is provided in order to elevate and lower cargo carriers 12 between the two levels. The second layer of the storage grid 14, that is the layer on top of the first layer of grid squares, has a structure similar to the structure of the lower layer of the storage grid 14. More than one additional layer on top of the first layer of the storage grid 14 is contemplated. This open grid square 62 does not have upper gear 74 and is therefore open at the top in order to effect transfer of cargo carriers 12 between the two levels. Where there is a second level to the storage grid 14, the cargo carriers 12 utilized with such storage grid 14 have grooves 35 similar to grooves 30, 34 defined on the exterior margins of the two opposed side panels 22. Such grooves are defined parallel to the underlying surface of the storage grid 14. A side gear 75 on both sides acts to engage respective grooves 35 to elevate and lower the container 12. Alternatively, as shown in FIG. 13b, the cargo carrier 12 can be elevated to a second level 90 of the storage grid 14 by way of a lift or piston. If a lift or piston is used to elevate the storage cell 12, then the side gears 75 on the sides and the grooves 35 are not required.

Figure 14:
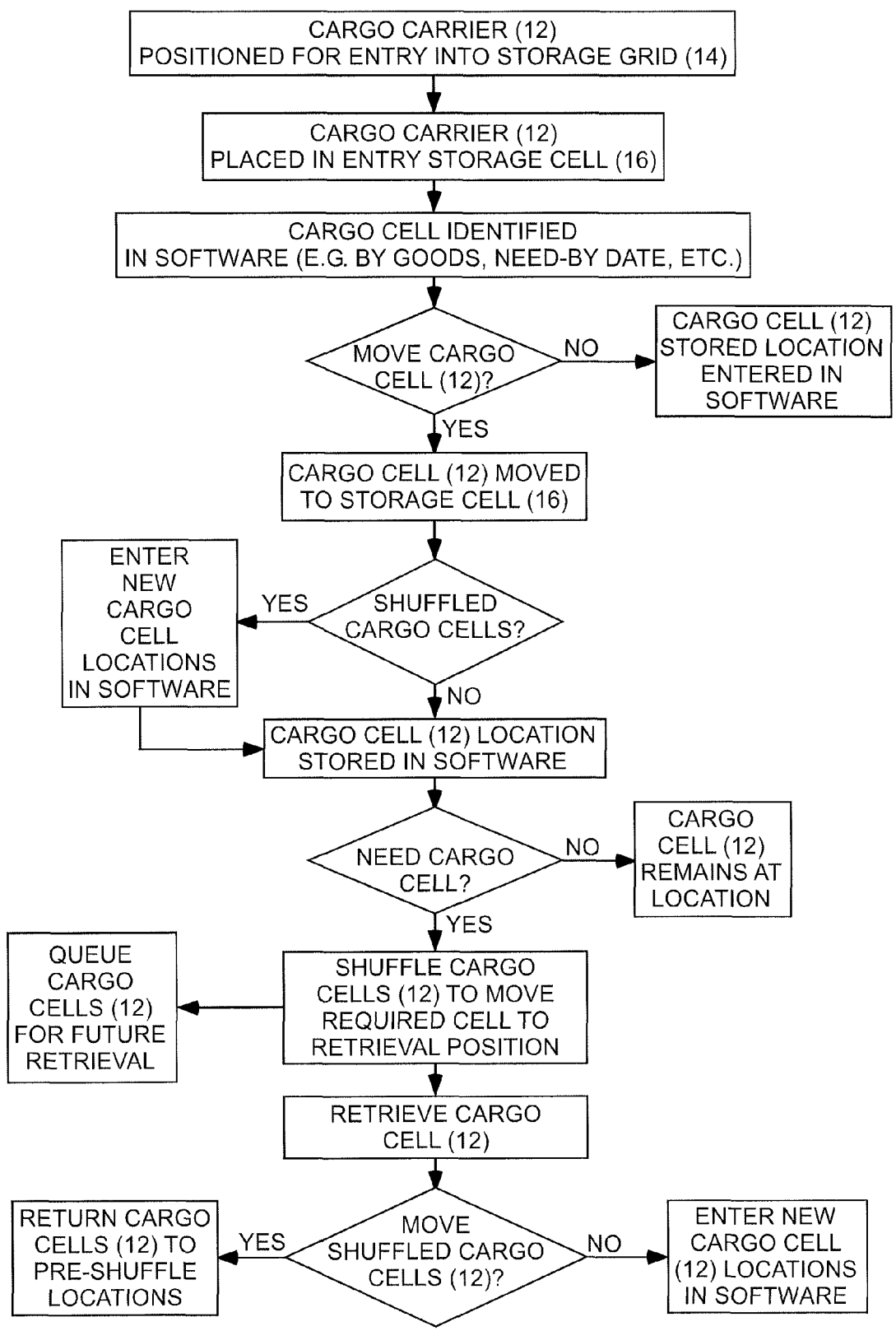
FIG. 14 is a flow chart representing the general process of loading and retrieving a cargo cell from the storage system.

Referring to FIG. 14, in operation a specific cargo carrier 12 that is to be entered into the storage grid 14 is positioned for entry into the storage grid 14. The storage grid 14 can have a designated entry storage cell 16 or a number of storage cells 16 can be utilized as an entry storage cell 16. The specific cargo carrier 12 is placed in an entry storage cell 16 and the specific cargo cell is 12 identified in a software database. Alternatively, the specific cargo carrier 12 is identified in the software database prior to placement in an entry storage cell 16. However, there is less opportunity for error if the specific cargo cell 12 is identified in the software database after being placed in an entry storage cell 16. The specific cargo cell 12 is identified in the software database by a variety of identifiers, for example, by the nature of the goods contained in the cargo cell 12, by the "need by date", by perishability, by order of delivery, cargo cell number, and so on. Other identifiers are contemplated. Once the specific cargo cell 12 has been identified and the identification entered into the software database, the software control system directs the movement and storage of the specific cargo carrier 12.

The specific cargo cell 12 is moved to its assigned location in the storage grid 14 by way of shuffling already stored cargo cells 12. The software control system determines the minimum number of cargo cells 12 that need to be shuffled to store the specific cargo cell 12 in its assigned location, and the specific cargo cell 12 is transported to its assigned location by way of the control system chosen path. Other parameters can be used in determining the optimal transport path, other than minimization of number of cargo cells shuffled. In one aspect, already stored cargo cell 12 may not need to be shuffled, dependent upon the specific cargo cell 12 location. Already stored cargo cells 12 that have been shuffled are returned to their previous locations, so that their locations do not need to be updated in the software database. Alternatively, the already stored cargo cells 12 that have been shuffled in the process of loading the specific cargo cell 12 into the storage grid 14 remain in their new locations, and the software control system and the software database interact so that the new locations for the cargo cells 12 are entered into the database.

Further, if a specific cargo cell 12 is required, the software database identifies the location of the specific cargo cell 12, and the software database interacts with the software control system to determine the cargo cells 12 that are required to be shuffled to obtain the transport path to move the specific cargo cell 12 to the desired location, such as a retrieval cell. The cargo cells 12 are shuffled and the specific cargo cell 12 is transported to the desired location, and unloaded from the storage grid 14. The already stored cargo cells 12 that have been shuffled are returned to their previous locations, so that their locations do not need to be updated in the software database. Alternatively, the already stored cargo cells 12 that have been shuffled in the process of retrieving the specific cargo cell 12 from the storage grid 14 remain in their new locations, and the software control system and the software database interact so that the new locations for the cargo cells 12 are entered into the database. The software control system and the software database are also used to shift cargo cells 12 in the storage grid 14, as needed; for example, to queue cargo cells 12 that will be needed before long.

While the storage system of the present invention has been shown and described in detail, the invention is not to be considered as limited to the exact forms disclosed, and changes in detail and construction may be made therein within the scope of the invention without departing from the spirit thereof.

The invention claimed is:

1. A storage system for efficiently managing the storage and retrieval of cargo, the storage system comprising:
    a plurality of storage cells disposed in a grid, said storage cells including an upper drive and a lower drive;
    a plurality of cargo carriers for holding cargo, said cargo carriers including a grooved upper mating surface that interfaces with the upper drive and a grooved lower mating surface that interfaces with the lower drive, the grooves of the upper mating surface transverse to the grooves of the lower mating surface; and
    a cargo carrier management system, operably connected to the grid, said carrier management system including a database of cargo carriers within the grid and a control system for directing movement and storage of the cargo carriers.

2. The storage system of claim 1 wherein the upper mating system is in orthogonal relationship to the lower mating system.

3. The storage system of claim 1 wherein the upper drive is in orthogonal relationship with the lower drive.

4. The storage system of claim 1 wherein the storage cells are aligned in interconnected proximity such that cargo carriers can move among the storage cells.

5. The storage system of claim 4 wherein the cargo carriers are moveable in an x-y direction within the grid.

6. The storage system of claim 1 wherein the grid includes a plurality of vertical layers, such that the storage cells are aligned in horizontal and vertical interconnected proximity such that the cargo carriers are moveable among the storage cells in an x-y-z direction.

7. The storage system of claim 6 wherein at least one storage cell has no upper drive, said storage cell operating to transport a cargo cell to a vertically-oriented layer.

8. The storage system of claim 1 wherein the cargo carriers further comprise a plurality of motors wherein the motors are operably connected to the upper drive and the lower drive such that motor actuation propels the cargo carrier among the storage cells of the grid.

9. The storage system of claim 1 wherein the upper drive and the lower drive comprise a plurality of shafts containing gears.

10. The storage system of claim 1 wherein at least one storage cell is left empty.

11. The storage system of claim 1 wherein the cargo carrier further comprises a securing system for securing cargo inside the cargo carrier comprising:
    a cargo net; and
    a plurality of fasteners operably connected to the cargo net and the cargo carrier, manipulation of said fasteners directing the cargo net to contact the top of the cargo and secure the cargo.

12. The storage system of claim 11 wherein the fasteners are cargo net screws, each cargo net screw rotatably engaged with a cargo net threaded coupler.

13. The storage system of claim 1 wherein additional storage cells are added to the storage grid by adding individual storage cells in any dimension and adding the location of the added storage cell to control logic of software controlling and managing the storage grid.

14. A storage system method for efficiently managing the storage and retrieval of a plurality of cargo carriers in a storage grid wherein at least one storage cell of the storage grid contains no cargo carrier, the method comprising:
    placing a cargo carrier in an entry storage cell;
    identifying the specific cargo carrier;
    recording the identification of the cargo carrier in a software database;
    providing instructions to a software control system to transport the cargo carrier to the desired storage cell location in the storage grid;
    transporting the cargo carrier to the desired storage cell, said cargo carrier including a grooved upper mating surface orthogonal to a grooved lower mating surface, said upper mating surface and lower mating surface interfacing with an upper drive and a lower drive; and
    recording the cargo carrier location in the software database.

15. The storage system method of claim 14 further comprising:
    identifying a specific cargo carrier to be retrieved from the storage grid;
    accessing the software database for the location of the specific storage carrier within the storage grid;
    providing instructions to the software control system to transport the cargo carrier to a desired retrieval storage cell in the storage grid;
    shuffling the storage carriers in the storage grid based upon instructions received from the software to present the specific cargo carrier in a desired retrieval storage cell for removal.

16. The storage system method of claim 15 wherein the cargo carriers stored in the storage grid are shuffled to make a path for transport of the specific cargo carrier to the desired storage cell.

17. The storage system method of claim 16 wherein the software minimizes the number of cargo carriers moved, to position the specific cargo carrier at the desired storage cell.

18. The storage system method of claim 15 wherein the shuffled cargo carriers are returned to their locations previous to shuffling.

19. The storage system method of claim 15 wherein the shuffled cargo carriers are assigned new locations in the software database.

20. A storage system for efficiently managing the storage and retrieval of cargo, the storage system comprising:
- a plurality of storage cells disposed in a grid, said storage cells including an upper drive and a lower drive;
- a plurality of cargo carriers for holding cargo, said cargo carriers including an upper mating surface that interfaces with the upper drive and a lower mating surface that interfaces with the lower drive;
- a cargo carrier management system, operably connected to the grid, said carrier management system including a database of cargo carriers within the grid and a control system for directing movement and storage of the cargo carriers; and
- wherein the cargo carriers further comprise a plurality of motors wherein the motors are operably connected to the upper drive and the lower drive such that motor actuation propels the cargo carrier among the storage cells of the grid.

* * * * *

UNITED STATES PATENT AND TRADEMARK OFFICE
CERTIFICATE OF CORRECTION

| | | |
|---|---|---|
| PATENT NO. | : 7,941,243 B2 | Page 1 of 1 |
| APPLICATION NO. | : 12/017945 | |
| DATED | : May 10, 2011 | |
| INVENTOR(S) | : Dennis W. Borgwarth et al. | |

It is certified that error appears in the above-identified patent and that said Letters Patent is hereby corrected as shown below:

Col. 2, line 34, delete "accesses" and insert --accessed--

Col. 4, line 5, delete "traverse grooves" and insert --transverse grooves--

Col. 4, line 57, delete "upright" and insert --uprights--

Col. 5, line 2, delete "transverse grooves" and insert --traverse grooves--

Signed and Sealed this
First Day of November, 2011

David J. Kappos
*Director of the United States Patent and Trademark Office*